(12) United States Patent
Gieseke et al.

(10) Patent No.: US 9,687,909 B2
(45) Date of Patent: Jun. 27, 2017

(54) CASTING DIE

(71) Applicant: KSM Castings Group GmbH, Hildesheim (DE)

(72) Inventors: Joerg Gieseke, Duingen (DE); Patrick Steinnebel, Giesen (DE)

(73) Assignee: KSM Castings Group GmbH, Hildesheim (DE)

(*) Notice: Subject to any disclaimer, the term of this patent is extended or adjusted under 35 U.S.C. 154(b) by 0 days.

(21) Appl. No.: 15/178,703

(22) Filed: Jun. 10, 2016

(65) Prior Publication Data
US 2017/0050240 A1    Feb. 23, 2017

(30) Foreign Application Priority Data
Aug. 20, 2015  (DE) .......................... 10 2015 113 790

(51) Int. Cl.
| | |
|---|---|
| *B22C 9/06* | (2006.01) |
| *B22D 17/20* | (2006.01) |
| *B22D 17/24* | (2006.01) |
| *B22D 17/22* | (2006.01) |
| *B22D 17/26* | (2006.01) |
| *B22D 33/04* | (2006.01) |
| *B29C 33/12* | (2006.01) |

(52) U.S. Cl.
CPC ................ *B22D 17/24* (2013.01); *B22C 9/06* (2013.01); *B22D 17/2007* (2013.01); *B22D 17/229* (2013.01); *B22D 17/2227* (2013.01); *B22D 17/2272* (2013.01); *B22D 17/26* (2013.01); *B22D 33/04* (2013.01); *B29C 33/12* (2013.01)

(58) Field of Classification Search
CPC ...... B22C 9/06; B22D 17/22; B22D 17/2227; B22D 17/229; B22D 17/24; B22D 17/26; B22D 33/04
USPC .......................... 164/113, 137, 312, 339, 342
See application file for complete search history.

(56) References Cited

U.S. PATENT DOCUMENTS

| | | | | |
|---|---|---|---|---|
| 4,990,077 A * | 2/1991 | Morita | ................ | B29C 45/1635 425/130 |
| 5,915,453 A * | 6/1999 | Tremblay | ................ | B22D 17/22 164/344 |
| 6,799,625 B2 * | 10/2004 | Eliat | ...................... | B22D 17/24 164/340 |
| 6,955,210 B2 * | 10/2005 | Matsuura | ............... | B22D 17/22 164/312 |

\* cited by examiner

*Primary Examiner* — Kevin E Yoon
(74) *Attorney, Agent, or Firm* — Collard & Roe, P.C.

(57) ABSTRACT

A casting die is formed from a mold half with a mold insert disposed at least partly in a relief of the mold half. The mold insert is mounted movably in the relief.

19 Claims, 5 Drawing Sheets

CASTING DIE

BACKGROUND OF THE INVENTION

1. Field of the Invention

This invention relates to a casting die comprising a mold half with a mold insert disposed at least partly in a relief of the mold half.

2. The Prior Art

Casting dies usually have two mold halves, wherein individual mold halves may be constructed from several individual parts. In order to be able to make different castings with one casting die, it is customary not to form the negative contour of the casting to be cast directly in the mold half, but instead to insert, within a relief of the mold half, several mold inserts that form the negative contour of the casting to be cast.

For this purpose, the mold inserts are inserted in a perfectly fitting relationship into the relief of the mold half and fastened immovably thereto with screw connections. Because of the perfectly fitting configuration of the mold insert and of the relief of the mold half, it is not possible for the mold insert to execute a lateral movement relative to the mold half. By fastening the mold insert with a screw connection, a vertical movement of the mold inserts relative to the mold half is additionally ruled out.

For a casting process, the mold halves are brought together, whereby one mold insert is usually pressed against a complementary mold insert in the second mold half, and a cavity, which will be filled with molten material during the casting process, is formed in their interiors. After filling of cavity with molten material and a solidification of the molten material, the mold halves are again moved apart and the solidified casting is removed from the mold inserts.

This separation process has the consequence that the mold halves can cool at different rates and thus a temperature difference develops between the mold halves. This temperature difference means that the mold inserts can also cool at different rates, shrink and exhibit a deviation of their position relative to their starting position.

The different cooling rates of the mold halves can accordingly lead to off-centering of the mold halves relative to one another and especially of the mold inserts disposed in the mold halves. Such an off-centering has the consequence that, in a subsequent casting process, the mold inserts do not bear ideally on one another but instead exhibit an offset relative to one another and that consequently unwanted defects can occur in the casting, especially different wall thicknesses.

In simple molds, which are provided with only one mold cavity for production of one casting per molding process, such an off-centering may possibly be compensated for by a manual realignment of the mold halves. The situation is more problematic for so-called multiple molds. These are provided with several mold cavities within the casting die and therefore have the ability to create several castings with the same casting die during a casting process.

A temperature difference between the mold halves and also between individual mold cavities of the casting die can also occur in such casting dies. However, this has the consequence not that the mold inserts, which form or encompass the mold cavities, are off-centered in identical manner, but instead that individual mold cavities or the mold inserts exhibit different off-centering from their complementary mold inserts.

Until now it has not been possible to eliminate such off-centerings in a simple manner, which has the consequence that more intensive post-machining is required for finishing of the casting. Precisely for rotationally symmetric castings, which during their intended use execute a rotary motion, it is important that the casting be uniformly machined in order to permit a movement that is as smooth-running as possible.

At present, such castings must be balanced in a complicated manner after the casting. However, the balancing can compensate for casting defects, especially different wall thicknesses to only a certain degree. In order to produce as few rejects as possible, it is accordingly important to avoid or at least minimize casting defects, especially different wall thicknesses of the casting.

SUMMARY OF THE INVENTION

It is therefore an object of the present invention to eliminate the problems of a casting die, especially of a casting die with several mold cavities, and especially to provide a casting die that has the ability to compensate for off-centering of the mold halves, especially of the mold inserts, and especially different off-centering of individual mold cavities within a casting die, and consequently to prevent casting defects, especially different wall thicknesses of the casting.

This object is accomplished in a casting die according to the invention comprising a mold half with a mold insert disposed at least partly in a relief of the mold half, wherein the mold insert is mounted movably in the relief.

Due to the movable mounting of the mold insert in the relief of the mold half, the mold insert is able to execute compensating movements. Due to these compensating movements, it is possible to compensate for an off-centering, occurring due to temperature differences or for other reasons, of the mold inserts of two mold halves relative to one another.

For this purpose, the movably mounted mold insert is automatically moved into a centered position during the bringing together of the mold halves. Thus it is possible to compensate for an offset that has developed between the mold inserts, so that the mold inserts of two mold halves again bear ideally on one another and consequently unwanted casting defects are avoided, such as in particular different wall thicknesses.

Furthermore, it is possible, in casting dies that have several mold cavities within a casting die, to mount the mold inserts of the different mold cavities within a mold half movably independently of one another. A corresponding mounting offers the advantage that different off-centerings between the mold inserts of the individual mold cavities are also reliably compensated for.

As a rule, it should be sufficient to mount only the mold insert of one mold half movably in the casting die.

It may be advantageous when a gap is formed between a region of one side of the mold insert and a region of one side of the relief of the mold half.

One possible configuration of a movable mounting of a mold insert in a relief of a mold half provides that the mold insert is inserted not in a perfectly fitting relationship into the relief of the mold half. To the contrary, the mold insert has a smaller dimension along one or two spatial directions than does the relief of the mold half.

Because of this smaller dimension, a gap is formed between one side of the mold insert and one side of the relief. This gap makes it possible to move the mold insert in one or two spatial directions within the relief. The degree of mobility and the available spatial directions in which the insert can move then depend on the exact configuration and especially the dimensioning of the mold insert.

It may be advantageous when at least one, preferably more than one, retaining element is provided by which the mold insert is held in the relief of the mold half but which permits a movement of the mold insert within the relief of the mold half, preferably parallel to the mold half.

Because of the smaller dimension of the mold insert in comparison with the relief of the mold half and of the non-existing screw connection between mold insert and mold half, if would be possible for the mold insert to become detached from the mold half during the casting process. In order to prevent detachment of the mold half from the relief, it may be advantageous to dispose one, preferably more than one retaining element on the mold half in such a way that the mold insert cannot become detached from the relief.

In this connection, an advantageous configuration of the retaining element can provide that the retaining element is fastened extensively and immovably, preferably reversibly on the mold half, at least over a partial region of the mold half and of the mold insert, wherein the mold insert and the mold half are flush at least in a rim region, meaning that they have a same height at least in one region, so that the retaining element can lie flat.

Such a retaining element permits the mold insert to be able to move within the relief of the mold half, preferably only parallel to the mold half, without being able to become detached from the mold half.

It may be advantageous if the retaining element is a clamping element. By the use of a clamping element as the retaining element, a clamping force or frictional force is exerted on the mold insert, whereby the mold insert is held within the relief, especially in position.

Advantageously, the clamping force or frictional force exerted by the clamping element on the mold insert is precisely large enough that the mold insert is held in position within the relief and does not shift autonomously from this position without action of a further force. Advantageously, the clamping force is precisely small enough that only a small further force is needed to move the mold insert within the relief.

It may be advantageous if the retaining element is fastened to the mold half, especially reversibly, by means of at least one fastening element, especially a screw or a bolt.

In order to join the retaining element immovably with the mold half, it may be advantageous if the retaining element is disposed on the mold half by means of a fastening element. It has been shown that a reversible screw connection, by means of which the clamping force of the retaining element can also be varied, may be of advantage.

It may be advantageous to dispose the fastening element in such a way that the head of the fastening element is countersunk in the retaining element and thus the top edge of the fastening element does not project above the top edge of the retaining element.

It may be advantageous if the mold half and the mold insert are respectively provided, in two mutually adjoining side regions, with a clearance, the depth of which is smaller than the depth of the relief of the mold half.

It may be advantageous if the clearance in the side region of the mold half and the clearance in the adjoining side region of the mold insert form a common hollow, in which at least one retaining element can be disposed at least partly.

For a problem-free mode of operation of the casting die, it is necessary for the mold halves of a casting die to bear on one another. In order not to influence this property, it may be advantageous if the retaining element is disposed directly on the mold half, in such a way that the top edge of the retaining element is flush with the top edge of the mold insert and the top edge of the mold half.

Such an arrangement of mold half, retaining element and mold insert is possible if the mold half and the mold insert respectively have, in two mutually adjoining side regions, a clearance, the depth of which is smaller than the depth of the relief of the mold half, and if the clearance in the side region of the mold half and the clearance in the adjoining side region of the mold insert form a common hollow, in which at least one retaining element can be disposed at least partly.

In a retaining element disposed in such a way, the fastening element joining the retaining element immovably with the mold half extends only in the region of the clearance of the mold half.

It may be advantageous if the common hollow extends over the entire length of the side region of the mold insert. The common hollows may be present at points along the side region or else may extend over the entire length of the side region of the mold insert. In an arrangement of the common hollows configured only as points or regions, a movement in one spatial direction can be permitted by the retaining elements disposed in the common hollows and at the same time a blocking effect can be achieved in the spatial direction perpendicular to this.

However, to permit movement in more than one spatial direction, it may be expedient if the common hollows extend over the entire length of the side region of the mold insert.

It may be advantageous if a gap is formed between a region of one side of the mold insert and a region of one side of the retaining element.

In the arrangement of the retaining element at least partly within a common hollow, it is necessary that, besides the gap formed between a region of one side of the mold insert and a region of one side of the relief of the mold half, a further gap is formed between a region of one side of the mold insert and a region of one side of the retaining element.

It may be advantageous if the gap is between 0.01 mm and 2 mm, preferably between 0.1 mm and 1 mm, and particularly preferably between 0.3 mm and 0.8 mm wide.

Depending on the configuration of the casting die and the occurring off-centering of individual mold inserts and their complements relative to one another, the gap widths necessary for the compensating movement may be different.

It may be advantageous if a sealing element, preferably elastic, is provided to seal the gap between mold half and mold insert and/or between retaining element and mold insert.

In one configuration of the casting mold, in which a gap is formed between the mold half and the mold insert and/or between the retaining element and the mold insert, dirt or other extraneous substances, which clog the gap, may be able to penetrate into this gap and thus negatively influence the functionality of the casting die with movable insert. In order to prevent such a negative influence, it is advantageous if the gap is sealed externally by means of a sealing element, so that no extraneous substances can penetrate into the gap.

To ensure that the gap is securely closed and remains so even during different movements of the mold insert, it is advantageous if the sealing element is of elastic nature and thus can be adapted to the movement of the mold insert and in association with this to the different gap widths.

It may be advantageous if the retaining element is provided with a recess, especially an undercut, in which the sealing element can be disposed at least partly.

For a problem-free mode of operation of the casting die, it is necessary that the mold halves of a casting die bear on one another. In order not to influence this property, it may be advantageous if the sealing element is disposed on the retaining element or the mold insert in such a way that the top edge of the sealing element is flush with the top edge of the retaining element or the top edge of the mold insert.

In order to ensure this, the sealing element may be advantageously disposed in a recess of the sealing element that may also be located in the mold insert. In order to prevent detachment of the sealing element from the recess and consequently from the mold half, it may be expedient to configure the recess in the form of an undercut. The sealing element is clamped in this undercut and, by virtue of the overhanging edge of the recess, cannot be detached from the recess.

It may be advantageous if the recess, especially the undercut, extends over the entire length of the retaining element.

It may be advantageous if the casting die comprises a centering device for the centering of the mold insert mounted movably in the relief of the mold half.

To ensure that the mold insert and its complement are automatically aligned relative to one another and compensate for any off-centerings during the bringing together of the mold halves, it may be advantageous if the casting die comprises a centering device.

For this purpose, a first part of the centering device may be disposed on a first mold half of a casting die and a second part of the centering device may be disposed on a second mold half. During the bringing together of the two mold halves, the first part of the centering device engages in the second part of the centering device and establishes a mechanical contact. During the further bringing together of the mold halves, these are aligned relative to one another by virtue of the mechanical contact of the centering device and any off-centerings of the mold halves, especially of the mold inserts, is compensated for Furthermore, it may be advantageous, for casting dies that are provided with several mold cavities within a casting die, if each of the existing mold cavities comprises a centering device, especially one that is independent of the other mold cavities.

Should the mold inserts of individual mold cavities have different off-centerings relative to one another, it is possible by the arrangement of independent centering devices on the individual mold cavities to compensate reliably for the different off-centerings between the mold inserts of the individual mold cavities.

It may be advantageous if the centering device is disposed on the mold insert.

To center the entire mold half in an automatic process is currently too complex and can be achieved only with difficulty. Furthermore, a larger amount of force and energy would have to be applied in order to align the entire mold half of a casting die by means of one centering device. In addition, the alignment of the entire mold half is time-intensive because of the mass of the mold half, since the more mass that must be moved, the more energy-expensive and slower the process becomes.

In order to accelerate the centering or the compensation of an off-centering, it may be practical to dispose the centering device directly on the mold insert. By virtue of the movable mounting of at least one mold insert, this can be moved relative to the mold half. The compensation for the off-centering therefore takes place only via the mold inserts and not via the total mold halves. Thus a smaller mass has to be moved, which leads to energy and time savings.

It may be advantageous if the centering device comprises an oblique plane.

In an advantageous configuration of the centering device, the centering device may comprise at least two oblique planes, wherein a first oblique plane is located on a first part of the centering device, which is disposed on a first mold insert in a first mold half of a casting die, and wherein a second oblique plane is located on a second part of the centering device, which is disposed on a second mold insert in a second mold half of a casting die.

During the bringing together of the mold halves, the two oblique planes slide along one another and, should an off-centering of the mold inserts be present, the mold inserts shift such that the two mold inserts rest ideally on one another.

It may be advantageous if the centering device has an at least largely round periphery.

For a centering of the mold inserts in more than one spatial direction, the centering device is ideally of rotationally symmetric, especially largely round shape. Thus an off-centering of the mold inserts is reliably compensated for regardless of the spatial direction.

It may be advantageous if the at least one relief of the mold half is provided with one or preferably no lubricant.

Depending on the configuration of the casting die, the purpose of use and the occurring off-centering of individual mold inserts and their complements relative to one another, it may be advantageous but equally it may also be disadvantageous if the relief of the mold half is provided with a lubricant.

A lubricant has the effect that the farther force for movement of the mold half and for compensation for the off-centering is smaller, which leads to more rapid compensation for the off-centering. On the other hand, the clamping force or frictional force is likewise influenced thereby, so that under certain circumstances a new off-centering of the mold insert develops.

It may be advantageous if not only a first mold insert but also at least one second mold insert is disposed in the mold half and a common hollow receiving a retaining element is formed between the mold inserts, advantageously by a clearance of the first mold insert, a clearance of the mold half as well as a clearance of the second mold insert.

It may be advantageous if the casting die is a pressure die-casting die.

BRIEF DESCRIPTION OF THE DRAWINGS

Improvements and advantageous configurations of the invention can also be inferred from the following descriptions of exemplary embodiments, which are illustrated in the drawing. Features essential to the invention can also be inferred from the arrangement of individual components, reliefs, recesses, clearances and/or hollows relative to one another, wherein.

DETAILED DESCRIPTION OF THE EMBODIMENTS

Figure 1:
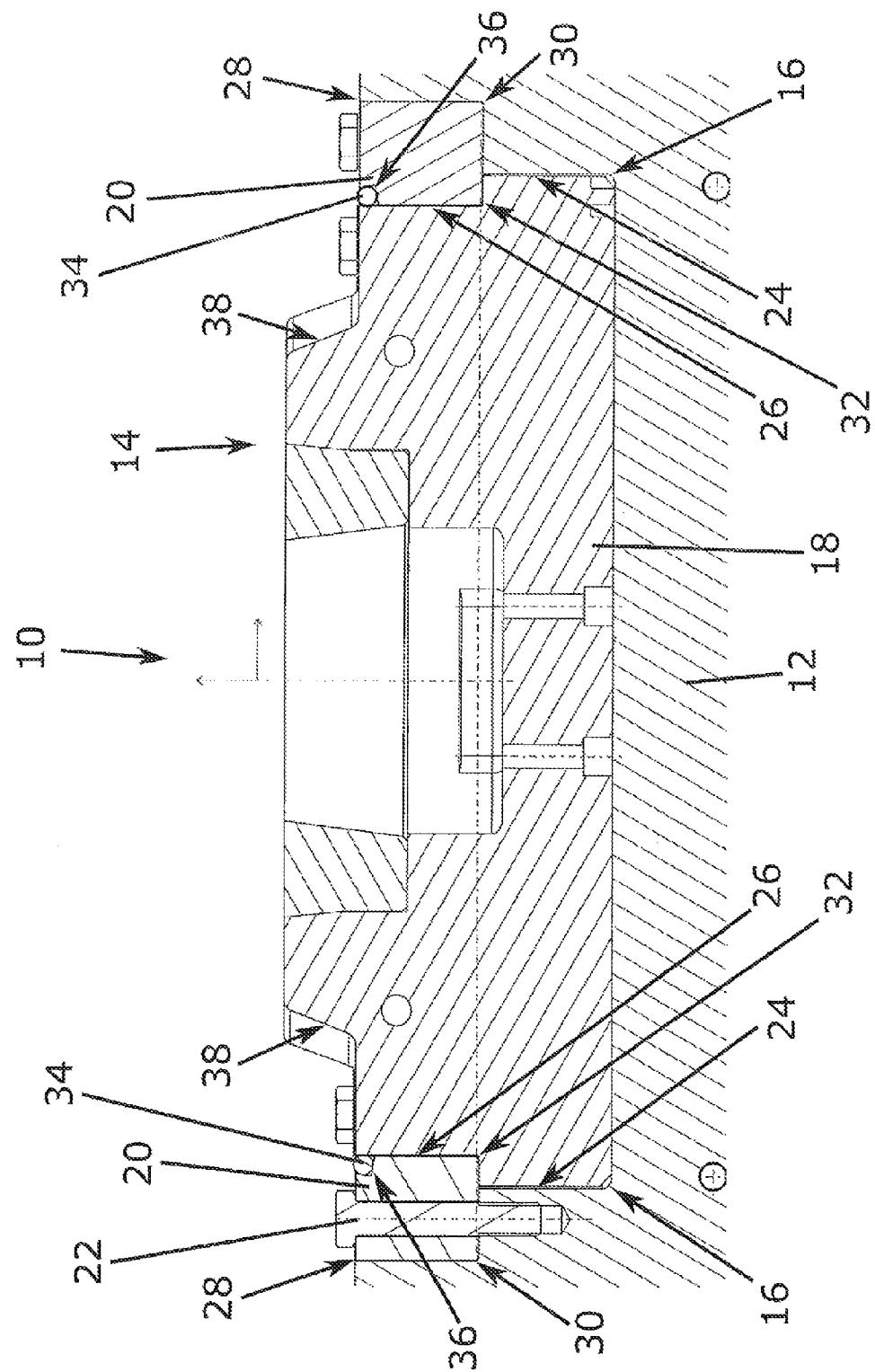
FIG. 1 shows a schematic sectional drawing of a mold half of a casting die comprising one mold cavity.

FIG. 1 shows a schematic sectional drawing of a mold half 12 of a casting die 10 comprising one mold cavity 14. Within a relief 16 of the mold half 12, a mold insert 18 is movably disposed at least partially. To ensure that the mold insert 18 cannot be detached from the relief 16 of the mold half 12, the mold insert 18 is held movably in the relief 16 by means of retaining elements 20. The retaining elements 20 are reversibly joined to the mold half 12 by means of fastening elements 22, especially screws. These fastening elements 22 are disposed only in the region of the clearance 30 of the mold half 12.

The mold insert 18 has a smaller dimensioning than the relief 16 of the mold half 12. Because of the smaller dimensioning of the mold insert 18, a gap 24 or 26 respectively is formed between a region of one side of the mold insert 18 and a region of one side of the relief 16 or respectively a region of one side of the retaining element 20. In the region of the floor of the clearance 32 of the mold insert 18, the retaining element 20 rests on the mold insert 18. The clamped connection between retaining element 20 and mold insert 18 is formed in this region.

In order not to influence the bringing together of the mold halves 12, the retaining elements 20 are disposed in common hollows 28. For this purpose, the common hollow 28 is formed by means of a first clearance 30 in the side region of the mold half 12 and a second clearance 32 in the adjoining side region of the mold insert 18.

To ensure that no dirt or another extraneous substance can penetrate into the gap 24 or 26, a sealing element 34 is disposed between retaining element 20 and mold insert 18. To ensure also that the sealing element 34 is largely flush with the top side of the retaining element 20 and of the mold insert 18, the sealing element 34 is disposed in a recess 36, which is located in the retaining element 20 but may also be located in the mold insert 18. In order to prevent detachment of the sealing element 34 from the recess 36 and consequently from the mold half 12, the recess 36 is made in the form of an undercut.

At the top side of the mold insert 18, a first part of a centering device 38 is disposed. In the present embodiment, the centering device 38 is a circular, circumferential oblique plane.

Figure 2:
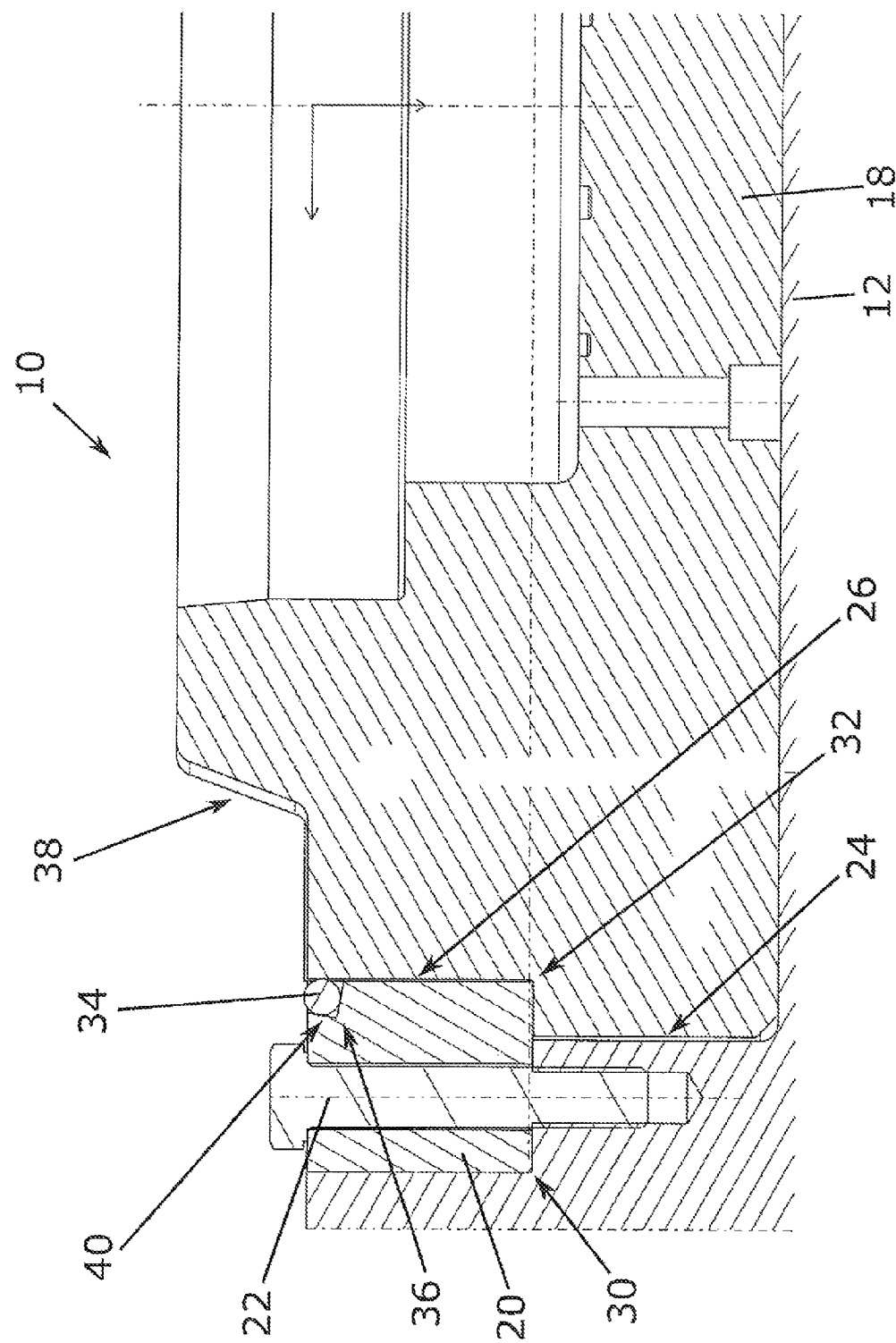
FIG. 2 shows a schematic sectional drawing of an enlarged side region of a mold half of a casting die comprising one mold cavity.

FIG. 2 shows an enlarged diagram of the left side region of the sectional drawing illustrated in FIG. 1.

The arrangement of the sealing element 34 in the recess 36 and the configuration of the recess 36 as an undercut 40 can be seen in this enlarged diagram.

Figure 3:
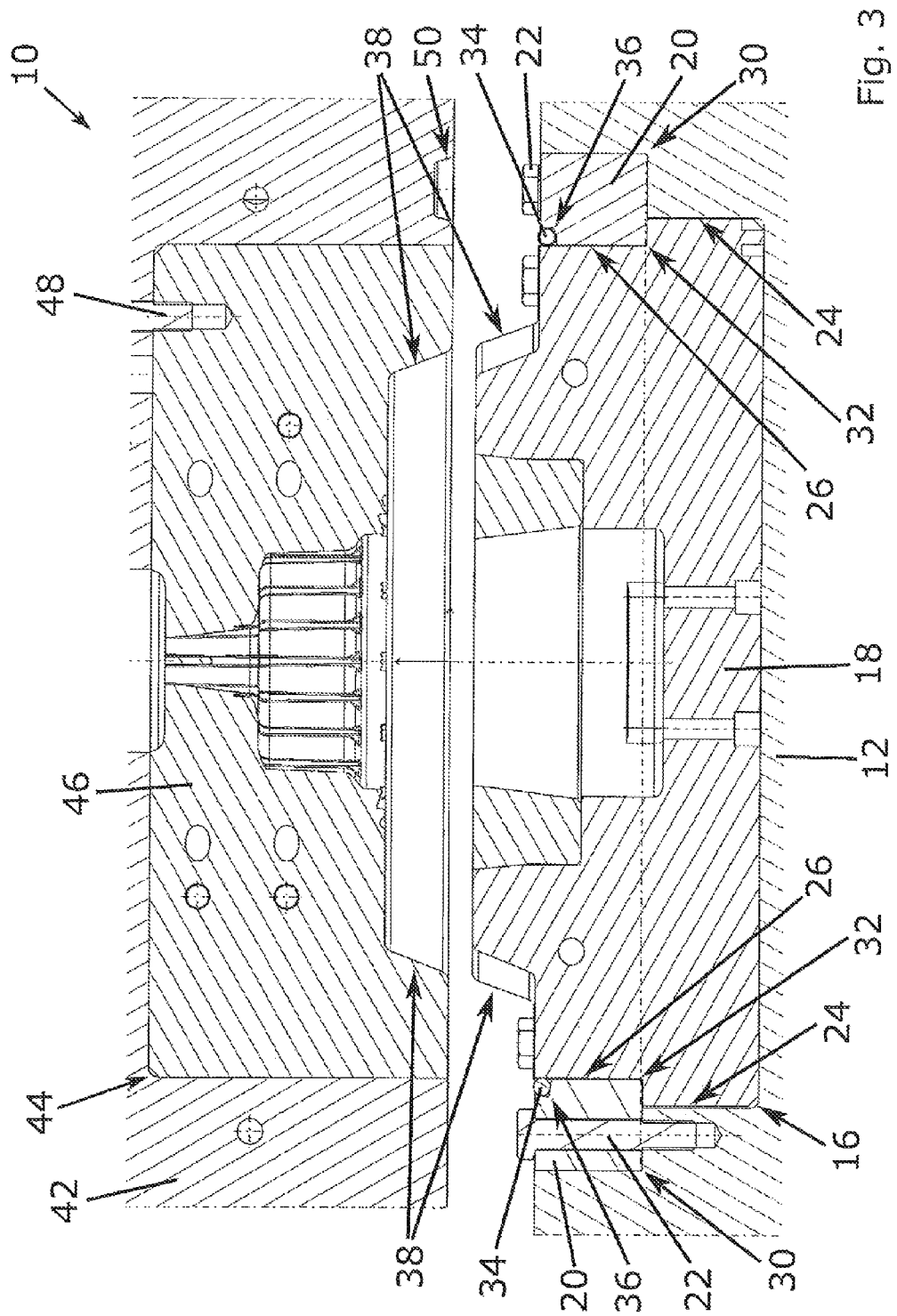
FIG. 3 shows a schematic sectional drawing of two complementary mold halves of a casting die comprising one mold cavity.

FIG. 3 shows a schematic sectional drawing of a casting die 10, wherein both mold halves 12, 42 are illustrated.

Within a relief 16 of a first mold half 12, a mold insert 18 is movably disposed at least partly. In contrast, in the shown embodiment, a mold insert 46 is disposed immovably within the relief 44 of a second mold half 42. This mold insert 46 is disposed in perfectly fitting relationship in the relief 44 and therefore cannot execute any lateral movement.

Furthermore, the mold insert 46 is reversibly joined to the mold half 42 by means of a fastening element 48, especially a screw.

To ensure that the mold insert 18 cannot be detached from the relief 16 of the mold half 12, the mold insert 18 is held movably by means of retaining elements 20 in the relief 16.

The retaining elements 20 are reversibly joined to the mold half 12 by means of fastening elements 22, especially screws. These fastening elements 22 are disposed only in the region of the clearance 30 of the mold half 12.

In the shown embodiment, the top edges of the fastening element 22 are not flush with the top edge of the retaining element 20. To permit a tight fitting of the mold halves 12, 42, the mold hall 42 is provided with holes 50, into which the heads of the fastening elements 22 can penetrate.

The mold insert 18 has a smaller dimensioning than the relief 16 of the mold half 12. Because of the smaller dimensioning of the mold insert 18, a gap 24 or 26 respectively is formed between a region of one side of the mold insert 18 and a region of one side of the relief 16 or respectively a region of one side of the retaining element 20. In the region of the floor of the clearance 32 of the mold insert 18, the retaining element 20 rests on the mold insert 18. The clamped connection between retaining element 20 and mold insert 18 is formed in this region.

In order not to influence the bringing together of the mold halves 12, the retaining elements 20 are disposed in common hollows 28. For this purpose, the common hollow 28 is formed by means of a first clearance 30 in the side region of the mold half 12 and a second clearance 32 in the adjoining side region of the mold insert 18.

To ensure that no dirt or another extraneous substance can penetrate into the gap 24 or 26, a sealing element 34 is disposed between retaining element 20 and mold insert 18. To ensure also that the sealing element 34 is largely flush with the top side of the retaining element 20 and of the mold insert 18, the sealing element 34 is disposed in a recess 36, which is located in the retaining element 20 but may also be located in the mold insert 18. In order to prevent detachment of the sealing element 34 from the recess 36 and consequently from the mold half 12, the recess 36 is made in the form of an undercut.

At the top side of the mold insert 18, a first part of a centering device 38 is disposed. This consists of an oblique plane, which runs circularly around the mold insert 18. This oblique plane is oriented in such a way that the oblique plane tapers conic-ally starting from the top side of the mold insert 18.

At the top side of the mold insert 46, a part of the centering device 38 complementary to the first part is disposed. This also consists of an oblique plane, which runs circularly around the mold insert 46. This oblique plane is oriented in such a way that the oblique plan flares conically starting from the top side of the mold insert 46.

Should the mold inserts 18 and 46 have an off-centering or an offset relative to one another during the bringing together of the mold halves 12 and 42, the oblique planes of the mold inserts 18 and 46 would slide over one another. By virtue of this coupling, a force larger than the clamping force or frictional force between the retaining element 20 and the mold insert 18 is developed. Consequently, the mold insert 18 is moved in the relief 16 and executes a compensating movement, with the result that the off-centering of the two mold inserts 18 and 46 relative to one another is compensated and the mold halves 18 and 46 bear ideally on one another.

Figure 4:
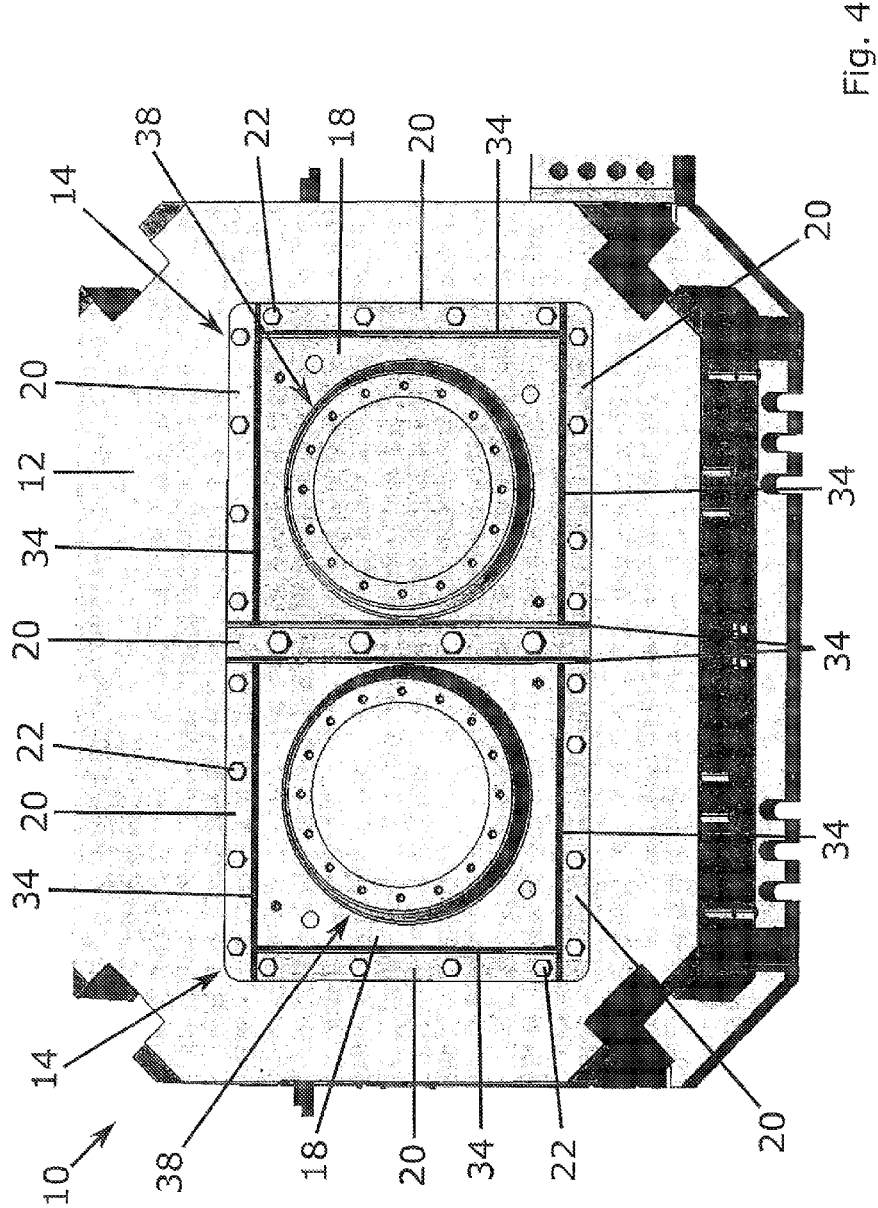
FIG. 4 shows a perspective view of a mold half of a casting die comprising two mold cavities.

FIG. 4 shows a perspective top view of a mold half 12 of a casting die 10 comprising two mold cavities 14. Within mold halves 12, two mold inserts 18 are movably disposed at least partly. Both of these mold inserts 18 are mounted to be movable independently of one another in such a way that they are able to execute lateral compensating movements in two spatial directions independently of one another.

To ensure that the mold inserts 18 cannot be detached from the reliefs of the mold halves 12, the mold inserts 18 are held movably in the relief with retaining elements 20. In the embodiment of FIG. 4, the retaining elements 20 are configured in such a way that the retaining elements 20 extend over the entire length of the side region of the mold inserts. The retaining elements 20 are joined reversibly to the mold halves 12 by means of fastening elements 22, especially screws.

The mold inserts 18 have a smaller dimensioning than the reliefs of the mold halves 12. Because of the smaller dimensioning of the mold inserts 18, a gap is formed between a region of one side of the mold insert 18 and a region of one side of the relief or respectively a region of one side of the retaining element 20.

To ensure that no dirt or another extraneous substance can penetrate into one of the gaps, a sealing element 34 is disposed between the retaining elements 20 and the mold inserts 18. To ensure also that the sealing element 34 is largely flush with the top side of the retaining element 20 and of the mold insert 18, the sealing element 34 is disposed in a recess.

At the top side of the mold inserts 18, two first parts of two independent centering devices 38 are disposed. These first parts consist of an oblique plane, which runs circularly around the mold inserts 18. These oblique planes are oriented in such a way that the oblique planes taper conically starting from the top side of the mold inserts 18.

Figure 5:
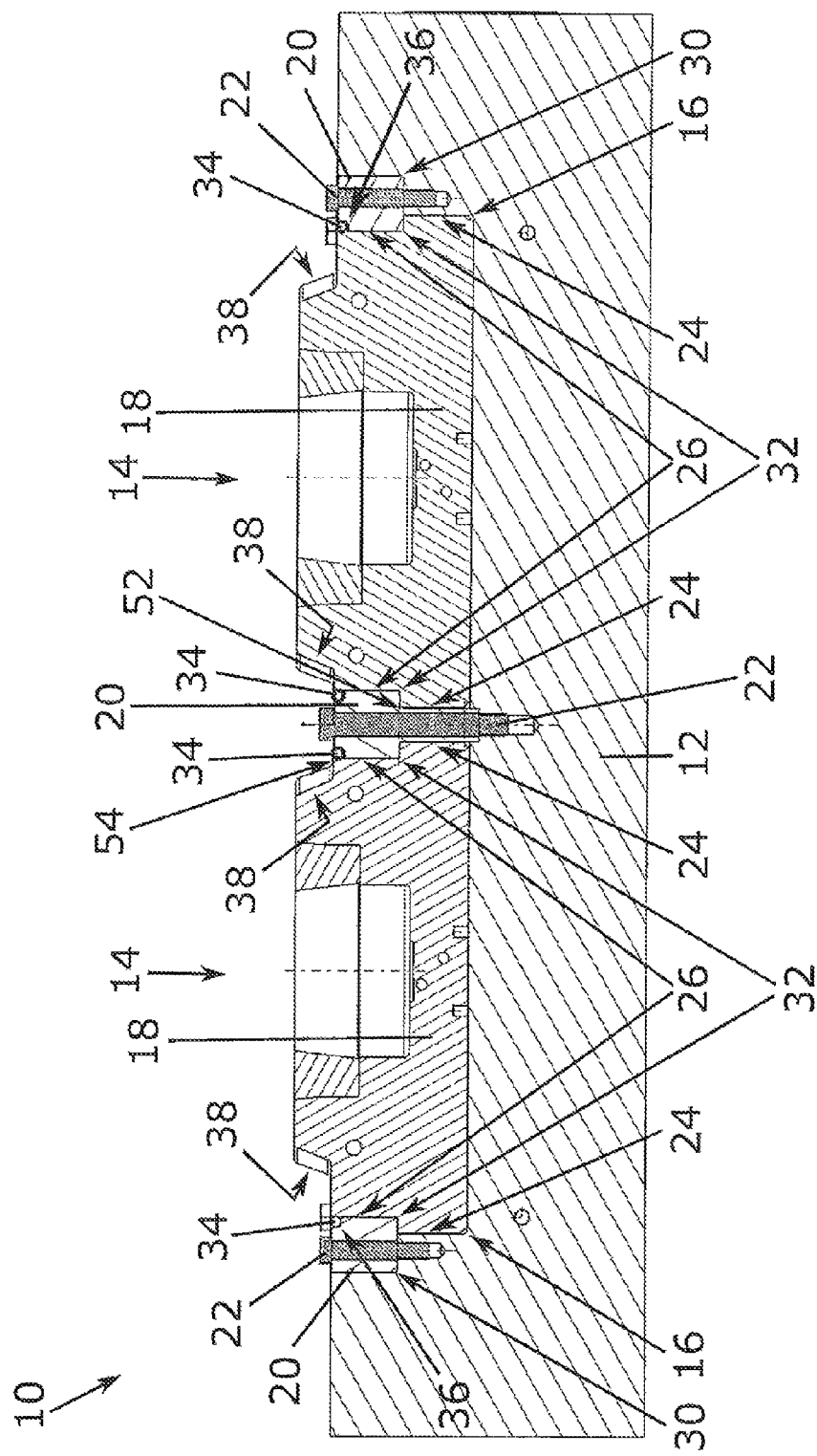
FIG. 5 shows a schematic sectional drawing of a mold half of a casting die comprising two mold cavities.

FIG. 5 shows a schematic sectional drawing of a mold half 12 of a casting die 10 comprising two mold cavities 14. Within two reliefs 16 in one mold half 12, two mold inserts 18 are movably disposed at least partly. Both of these mold inserts 18 are mounted to be movable independently of one another in such a way that they are able to execute lateral compensating movements independently of one another.

To ensure that the mold inserts 18 cannot be detached from the reliefs 16 of the mold halves 12, the mold inserts 18 are held movably in the reliefs 16 by means of retaining elements 20. The retaining elements 20 are joined reversibly to the mold halves 12 by means of fastening elements 22, especially screws. These fastening elements 22 are disposed only in the region of the clearances 30 and of the clearance 52 of the mold half 12.

The mold inserts 18 have a smaller dimensioning than the reliefs 16 of the mold halves 12. Because of the smaller dimensioning of the mold inserts 18, a gap 24 or 26 respectively is formed between a region of one side of the mold insert 18 and a region of one side of the reliefs 16 or respectively a region of one side of the retaining element 20. In the region of the floor of the clearance 32 of the mold inserts 18, the retaining elements 20 rest on the mold insert 18. The clamped connection between retaining element 20 and mold insert 18 is formed in this region.

In order not to influence the bringing together of the mold halves 12, the retaining elements 20 are disposed in common hollows 28, 54. For this purpose, the common hollow 28 is formed by a first clearance 30 in the side region of the mold half 12 and a second clearance 32 in the adjoining side region of the mold insert 18. The hollow 54 between the two mold inserts 18 is formed by a clearance 32 of the first mold insert 18, a clearance 32 of the second mold insert 18 and a clearance 52 of the mold half 12.

To ensure that no dirt or another extraneous substance can penetrate into the gaps 24 or 26, sealing elements 34 are disposed between the retaining elements 20 and the mold inserts 18. To ensure also that the sealing elements 34 are largely flush with the top sides of the retaining elements 20 and of the mold inserts 18, the sealing elements 34 are disposed in recesses 36, which are located in the retaining elements 20 but may also be located in the mold inserts 18. In order to prevent detachment of the sealing elements 34 from the recesses 36 and consequently from the mold halves 12, the recesses 36 are made in the form of an undercut.

At the top side of the mold inserts 18, two first parts of two independent centering devices 38 are disposed. These first parts consist of an oblique plane, which runs circularly around the mold inserts 18. These oblique planes are configured in such a way that the oblique planes taper conically starting from the top side of the mold inserts 18.

LIST OF REFERENCE NUMERALS (is part of the description)
10 Casting die
12 Mold half
14 Mold cavity
16 Relief
18 Mold insert
20 Retaining element
22 Fastening element
24 Gap
26 Gap
28 Hollow
30 Clearance
32 Clearance
34 Sealing element
36 Recess
38 Centering device
40 Undercut
42 Mold half
44 Relief
46 Mold insert
48 Fastening element
50 Hole
52 Clearance
54 Hollow

What is claimed is:

1. A casting die comprising a mold half with a mold insert disposed at least partly in a relief of the mold half, wherein the mold insert is mounted movably in the relief, and at least one retaining element that holds the mold insert in the relief of the mold half but which permits a movement of the mold insert within the relief of the mold half.

2. The casting die according to claim 1, wherein a gap is formed between a region of one side of the mold insert and a region of one side of the relief of the mold half.

3. The casting die according to claim 2, wherein the gap is between 0.01 mm and 2 mm wide.

4. The casting die according to claim 2, wherein a sealing element is provided to seal the gap between the mold half and the mold insert and/or between the retaining element and the mold insert.

5. The casting die according to claim 4, wherein the retaining element is provided with a recess in which the sealing element is at least partially disposed.

6. The casting die according to claim 5, wherein the recess extends over an entire length of the retaining element.

7. The casting die according to claim 1, wherein the retaining element is a clamping element.

8. The casting die according claim 1, wherein the retaining element is fastened to the mold half by at least one fastening element.

9. The casting die according to claim 8, wherein the mold half and the mold insert are respectively provided in two mutually adjoining side regions, with a clearance, a depth of which is smaller than a depth of the relief of the mold half.

10. The casting die according to claim 9, wherein the clearance in the side region of the mold half and the clearance in the adjoining side region of the mold insert form a common hollow, in which the at least one retaining element is disposed at least partially.

11. The casting die according to claim 10, wherein the common hollow extends over an entire length of the side region of the mold insert.

12. The casting die according to claim 10, wherein a gap is formed between a region of one side of the mold insert and a region of one side of the retaining element.

13. The casting die according to claim 1, wherein the casting die comprises a centering device for centering the mold insert mounted movably in the relief of the mold half.

14. The casting die according to claim 13, wherein the centering device is disposed on the mold insert.

15. The casting die according to claim 13, wherein the centering device comprises an oblique plane.

16. The casting die according to claim 13, wherein the centering device has an at least largely round periphery.

17. The casting die according to claim 1, wherein the at least one relief of the mold half is provided with one or no lubricant.

18. The casting die according to claim 1, further comprising an additional mold insert disposed in the mold half, wherein a common hollow receiving a retaining element is formed between the mold inserts, by a clearance of the mold insert, a clearance of the mold half as well as a clearance of the additional mold insert.

19. The casting die according to claim 1, wherein the casting die is a pressure die-casting die.

* * * * *